Figure 1:
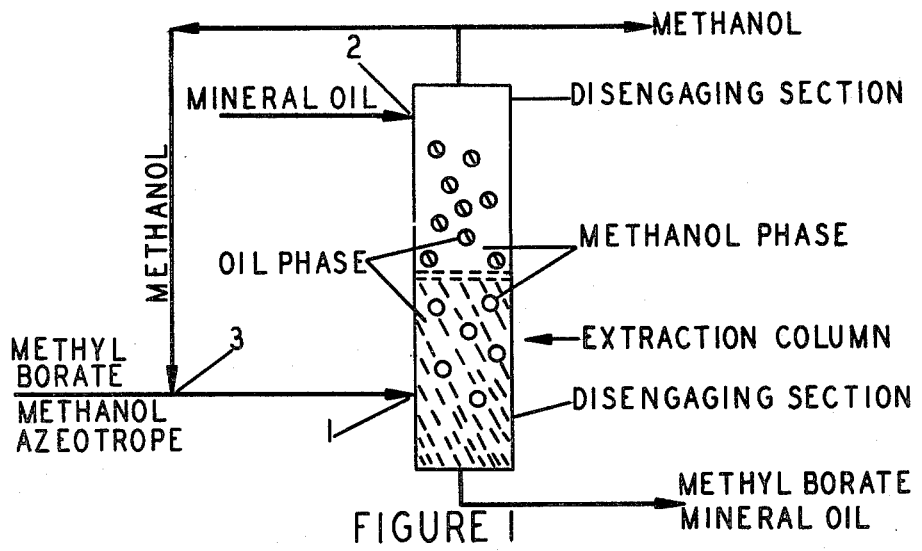

July 5, 1960

C. H. RICE 2,944,076

PREPARATION OF METHYL BORATE

Filed May 4, 1956

2 Sheets-Sheet 1

PREPARATION OF METHYL BORATE

PREPARATION OF METHYL BORATE

United States Patent Office 2,944,076
Patented July 5, 1960

2,944,076

PREPARATION OF METHYL BORATE

Charles H. Rice, Pittsburgh, Pa., assignor to Callery Chemical Company, Pittsburgh, Pa., a corporation of Pennsylvania Filed May 4, 1956, Ser. No. 583,605

8 Claims. (Cl. 260—462)

This invention relates to the recovery of methyl borate from methyl borate-methanol mixtures and more particularly to a method of countercurrently extracting methyl borate from such mixtures with a mineral oil.

Methyl borate $[B(OCH_3)_3]$ is recovered as methanol-methyl borate azetrope from the common methods of preparation such as distillation from mixtures of methanol and boric acid or boric oxide. As is the case in all distillation methods of separating pure components from an azeotrope, the distillation methods of separating methyl borate from the azeotrope are complicated and expensive.

It has recently been discovered (see Ton, Ser. No. 389,150, filed Oct. 29, 1953, now U.S. Patent No. 2,802,018) that when the azeotrope and mineral oil are mixed, methyl borate is distributed between two liquid phases. One phase contains substantially methyl borate and mineral oil; this phase will hereinafter be called the oil phase. The other phase contains substantially methyl borate and methanol and will hereinafter be called the methanol phase. Methyl borate is easily recovered from the oil phase by flash distillation. In order to transfer substantially all the methyl borate from the methanol phase to the oil phase it is necessary to extract it with several successive portions of mineral oil. This series of batch extractions is wasteful of solvent, since the amount of methyl borate in the oil phase is less for each successive extraction.

The maximum extraction for any given amount of solvent can be obtained in a countercurrent liquid-liquid extraction, since the extract oil phase is in equilibrium with the methyl borate-methanol solution which has a maximum methyl borate concentration. Methyl borate, however, cannot be countercurrently extracted from the azeotrope with mineral oil in the usual manner because of a density inversion in the methanol phase. The methanol phase rich in methyl borate is heavier than the oil phase and a methanol phase poor in methyl borate is less dense than the oil phase.

It is therefore an object of this invention to provide a continuous process of producing methyl borate from the methanol azeotrope easily and economically.

It is also an object of this invention to provide a method of countercurrently extracting methyl borate from mixtures with methanol with an extractive mineral oil solvent.

It is further an object to provide a method of countercurrently extracting a component from a liquid mixture with an extractive solvent in a phase system in which a density inversion occurs.

Other objects will become apparent from the description and claims hereinafter related.

This invention is based on the discovery that methyl borate can be countercurrently extracted from mixtures with methanol if the mixture composition is adjusted so that its density is lower than the density of the extracting liquid.

One mode of practicing this invention is illustrated in the schematic drawing, Figure 1. The methyl borate-methanol solution is fed to the extractor at point 1, near the bottom of the extractor. Mineral oil is fed near the top of the extractor at point 2. As the oil phase falls through the extractor it becomes richer in methyl borate, is separated from any remaining portions of the methanol phase in the lower disengaging section, and is recovered from the disengaging section as product. As the methanol phase rises in the extractor it looses methyl borate to the oil phase and is evolved at the top of the extractor as almost pure methanol. A portion of the methanol raffinate phase is returned and mixed with the azeotrope at 3. This mixture of azeotrope and methanol is the methanol phase feed to the extractor.

It is essential for operation of the extractor that this diluted feed be used because of the density inversion between the methanol phase and the oil phase if azeotrope is fed. For example, at 22° C. the maximum density of a stable oil phase is 0.877 g./ml., the density of methyl borate azeotrope is .884 and the density of methanol is .792. Thus when azeotrope is fed at 1 rather than methanol diluted feed, it passes directly to the bottom of the extractor and no countercurrent extraction is accomplished. Similarly, when oil is fed at 1 and azeotrope is fed at 2 no countercurrent extraction occurs. The azeotrope first falls down the column, but as methyl borate is extracted, the methanol phase becomes lighter than the oil phase and begins to rise. In dynamic equilibrium, then, the azeotrope feed will short circuit across the top of the extractor.

In order to perform a continuous countercurrent extraction the methyl borate methanol solution must be dilute enough (in respect to methyl borate) so that it is less dense than the oil phase at the feed point. The oil phase at the feed point is essentially a solution of methyl borate in mineral oil in equilibrium with the feed solution. An effective dilution of a too concentrated feed may be accomplished by adding methanol to the feed or by removing methyl borate from the methanol phase. While the process is operable when the feed is less dense than the oil phase at the feed point, the countercurrent extraction is more easily carried out if the feed solution has a composition such that it is less dense than the extracting oil. For example at 22° C. using a mineral oil with a density of .85 it is preferred to dilute an azeotrope with an amount of methanol so that it contains not more than 44% methyl borate, at which composition its density is 0.848. The compositions of the equilibrium phases change slightly with a change in temperature, but in no case is there a stable oil phase which is more dense than azeotrope at a corresponding temperature.

The recycle of the raffinate as illustrated in Figure 1 is a convenient way of diluting the azeotrope. Other methods of diluting the feed with methanol would be equally as satisfactory. Furthermore, the conditions at which the methyl borate is made may be adjusted so that it is recovered directly as a lean mixture of methyl borate in methanol rather than azeotrope.

Figure 2:
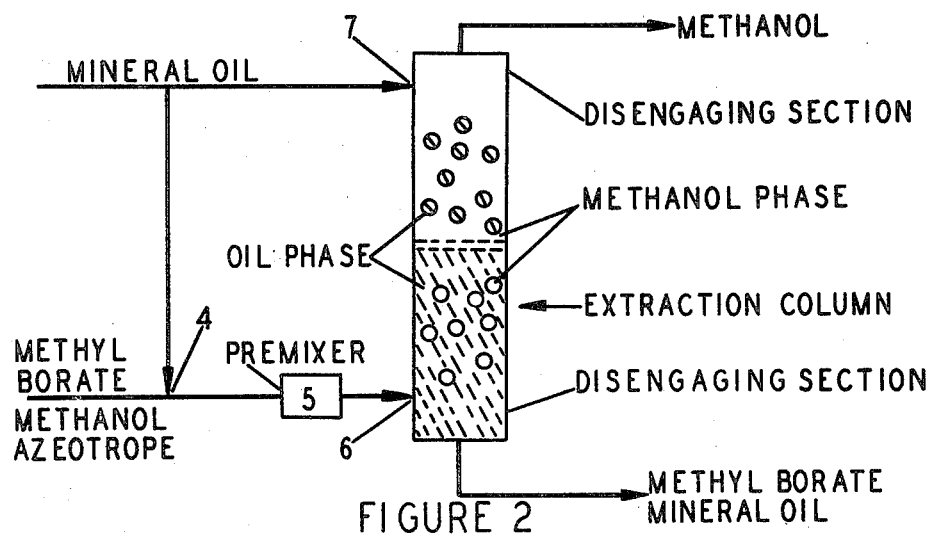

A second mode of practicing the invention is illustrated in Figure 2. In this case, a portion of the methyl borate is extracted from the azeotrope before it is fed to the countercurrent extractor. A portion of the mineral oil is mixed with the azeotrope feed at 4. This mixture is passed through premixer 5. The relative amounts of mineral oil and azeotrope introduced to the premixer are adjusted so that the methanol phase discharged from the premixer is lighter than the mineral oil extracting liquid. For example when a feed solution of azeotrope is mixed with an equal weight of mineral oil the methanol phase effluent from the premixer contains only 43% methyl borate. Additional oil for the countercurrent extraction is introduced to the extractor at 7. The countercurrent extractor then operates in the same manner as in the previous example.

The premixer may be any variety of apparatus that provides good mixing action such as an agitated pot or a section of pipe in which the liquid flow is very turbulent. It is convenient to design the premixer so that about one equilibrium extraction stage is realized. The premixer may be operated continuously or premixers may be operated batchwise in parallel to supply a continuous feed to the countercurrent extractor. No special type of countercurrent extraction equipment is required for the practice of this invention. The extractor may be any of the apparatus normally used for countercurrent liquid-liquid extraction such as a packed column, plate column, or a series of agitated cells.

Figures 1 and 2 show the liquid-liquid interface between the solution and solvent feed points. The process is equally operable with the liquid-liquid interface held above the oil feed point, in which case the continuous phase is the oil phase, or with the interface below the solution feed point in which case the continuous phase is the methanol phase.

It is apparent that methanol-methyl borate mixtures other than azeotrope which cannot be extracted countercurrently in the normal manner may be used in the same manner as the azeotrope.

These processing methods are generally applicable to liquid-liquid extraction in any system in which a density inversion occurs. The above examples have been of a system in which the feed is heavier than the extracting liquid and the raffinate phase is lighter than the extracting liquid. The dilution methods work equally as well in systems in which the feed solution is lighter and the raffinate heavier than the extracting liquid.

Figure 3:
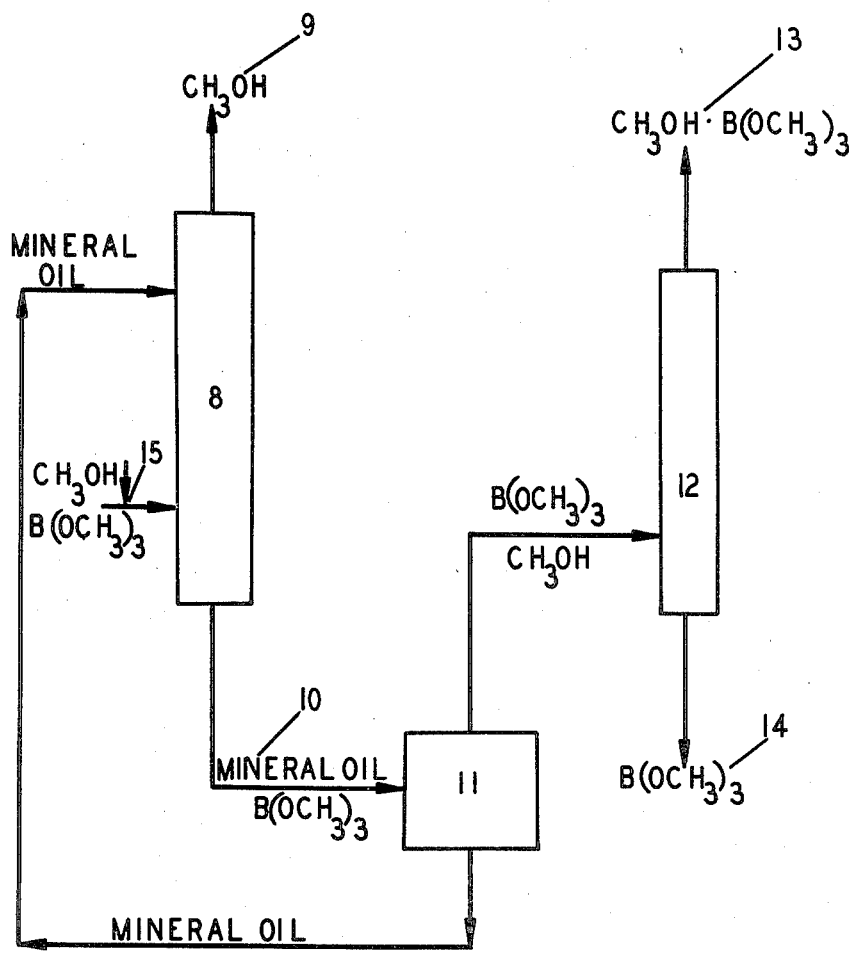

Figure 3 is a schematic flow sheet incorporating a method of recovering methyl borate from the extract oil phase obtained from the countercurrent extraction. The extractor 8 is a countercurrent extractor including a dilution provision such as described above. The raffinate methanol phase 9 is recovered or recycled for reuse in making more methyl borate. The extract oil phase 10 is sent from the extractor to a flash evaporator 11, where methyl borate is vaporized from the mineral oil. The oil phase from the extractor is not entirely methanol free, it may contain on the order of 2% methanol. This methanol is vaporized in the flash evaporator 11 along with the methyl borate. This mixed vapor is sent to a removed overhead 13 and pure methyl borate 14 is the bottoms product. The overhead azeotrope product is recycled and mixed with the azeotrope feed to the extractor at 15.

Although several embodiments of the invention have been described it is to be understood that within the scope of the claims this invention may be practiced otherwise than as specifically described.

Having thus described my invention and the manner in which it is performed what I desire to claim and secure by Letters Patent of the United States is:

1. A method of separating methyl borate from mixtures with methanol that comprises countercurrently contacting a falling extractive mineral oil with a rising methyl borate-methanol solution which has a lower density than an equilibrium solution of methyl borate in the extractive oil, and separating methyl borate from the resultant methyl borate-oil solution.

2. A method according to claim 1 in which the methyl borate-methanol solution is obtained by mixing mineral oil and a methyl borate-methanol solution of substantially azeotrope composition.

3. A method of separating methyl borate from mixtures with methanol that comprises countercurrently contacting a falling extractive mineral oil with a rising methyl borate-methanol solution which has a lower density than the extractive oil, and separating methyl borate from the resultant methyl borate-oil solution.

4. A method according to claim 3 in which the methyl borate-methanol solution is formed by mixing a methyl borate-methanol solution of substantially azeotrope composition with methanol.

5. A method according to claim 4 in which the methanol is obtained from the recycle of a portion of the extractor raffinate phase.

6. A method according to claim 3 in which the methyl borate-methanol solution is obtained by mixing mineral oil and a methyl borate-methanol solution of substantially azeotrope composition.

7. A method of separating methyl borate from methanol which comprises mixing equal weights of an extractive mineral oil and a methyl borate-methanol solution of substantially azeotrope composition and countercurrently extracting this mixture with a falling extractive mineral oil, and separating methyl borate from the resultant methyl borate-oil solution.

8. A process of recovering methyl borate from methanol-methyl borate mixtures which comprises countercurrently contacting a falling extractive mineral oil with a rising methyl borate-methanol solution which has a lower density than an equilibrium solution of methyl borate in the extractive oil, evaporating methyl borate and residual alcohol from the extract oil phase, recycling the oil for further extraction, fractionating the methyl borate-methanol mixture evaporated to produce pure methyl borate and methyl borate-methanol azeotrope, and recycling the azeotrope for further extraction.

References Cited in the file of this patent

UNITED STATES PATENTS 2,802,018    Ton                 Aug. 6, 1957

OTHER REFERENCES

Perry: "Chemical Engineers' Handbook," 3rd edition, McGraw-Hill Book Co., Inc., New York (1950), page 717.